US006911982B1

(12) United States Patent
Signes

(10) Patent No.: US 6,911,982 B1
(45) Date of Patent: Jun. 28, 2005

(54) DATA SIGNAL FOR MODIFYING A GRAPHIC SCENE, CORRESPONDING METHOD AND DEVICE

(75) Inventor: Julien M. Signes, Rennes (FR)

(73) Assignees: France Telecom, Paris (FR); Telediffusion de France, Paris Cedex (FR)

( * ) Notice: Subject to any disclaimer, the term of this patent is extended or adjusted under 35 U.S.C. 154(b) by 0 days.

(21) Appl. No.: 09/462,376
(22) PCT Filed: Jul. 10, 1998
(86) PCT No.: PCT/FR98/01520
§ 371 (c)(1), (2), (4) Date: Mar. 7, 2000
(87) PCT Pub. No.: WO99/03280
PCT Pub. Date: Jan. 21, 1999

(30) Foreign Application Priority Data

Jul. 11, 1997 (FR) .......................................... 97 09120

(51) Int. Cl.[7] .............................................. G06T 15/70
(52) U.S. Cl. ...................................................... 345/473
(58) Field of Search ................................ 345/419, 619, 345/629, 634, 636, 638, 473, 474, 475; 348/14.01, 14.02, 14.03, 14.04, 14.05, 14.06, 14.07, 14.08, 14.09, 14.1; 375/240.01, 240.12

(56) References Cited

U.S. PATENT DOCUMENTS

| | | | | |
|---|---|---|---|---|
| 5,166,744 | A | * 11/1992 | Calvani et al. .............. | 356/128 |
| 5,710,877 | A | * 1/1998 | Marimont et al. .......... | 345/427 |
| 5,715,416 | A | * 2/1998 | Baker .......................... | 345/839 |
| 5,841,447 | A | * 11/1998 | Drews ......................... | 345/563 |
| 5,850,535 | A | * 12/1998 | Maystrovsky et al. ...... | 345/418 |
| 6,002,401 | A | * 12/1999 | Baker .......................... | 345/839 |
| 6,108,460 | A | * 8/2000 | Rich ............................ | 382/304 |
| 6,232,974 | B1 | * 5/2001 | Horvitz et al. .............. | 345/419 |
| 6,437,784 | B1 | * 8/2002 | Bentley et al. ............. | 345/473 |
| 6,456,288 | B1 | * 9/2002 | Brockway et al. .......... | 345/428 |

FOREIGN PATENT DOCUMENTS

| | | | |
|---|---|---|---|
| EP | 692 911 | * | 1/1996 |
| EP | 753 834 | * | 1/1997 |
| EP | 9 034675 | * | 2/1997 |

OTHER PUBLICATIONS

Arikawa et al.; "Dynamic LoD for QoS Management in the Next Generation VRML"; International Conference of Multimedia Computing and Systems; Jun. 17, 1996; pp. 24–27; XP–002060163.*

Doenges, P. et al.; "MPEG–4: Audio/video and synthetic graphics/ audio for mixed media"; Signal Processing: Image Communication; vol. 4, No. 9, 1997; pp. 433–463.*

Avaro et al.; "The MPEG–4 systems and description languages: A way ahead in audio visual information representation"; Signal Processing; Image Communication, vol. 4, No. 9, 1997; pp. 385–431.*

"Tagging Objects to Form an Arbitrary Group"; IBM Technical Disclosure Bulletin., vol. 40,, No. 5, 1997, pp. 115–116; XP–002062198.*

International Search Report (PCT/ISA/220).*

* cited by examiner

*Primary Examiner*—Mark Zimmerman
*Assistant Examiner*—Enrique L. Santiago
(74) *Attorney, Agent, or Firm*—Merchant & Gould P.C.

(57) ABSTRACT

A data signal for modifying a graphic scene displayed on at least one terminal, the graphic scene mode of a set of graphic objects and each object defined by at least one field. The data signal includes frames containing information for updating the graphic scene. Some of the frames also contain a command to completely replace the graphic scene with a new scene. Further, a method of transmitting a data signal to modify a graphic scene displayed on a terminal. Also, a terminal for displaying a graphic scene, the terminal processing a signal for modifying the graphic scene.

22 Claims, 4 Drawing Sheets

DATA SIGNAL FOR MODIFYING A GRAPHIC SCENE, CORRESPONDING METHOD AND DEVICE

The field of the invention is that of the displaying of animated graphics scenes, for example, on a multi-media terminal. More precisely, the invention relates to the modification of animated scenes, that is to say, the carrying out of point changes, remotely commanded, for example, by a remote server, of a graphic scene displayed on a terminal.

By graphic scene, here one understands the layout of graphic objects, video and picture in time and in space. Such graphic scenes can be in two or in three dimensions, and contain various of graphic primitives.

The invention finds applications in all cases where it may be necessary to modify the structure of a graphic scene or of an element making it up.

Hence, the invention can be used in a large number of advanced multi-media applications. In particular, the invention can be advantageously applied to
- advanced digital television and communications services in which messages may be exchanged in graphic form. It is, for example, possible to add messages in video form to set up a video-conference by superimposing a traditional digital video. Advertising messages or logos can also be added to an existing scene;
- multi-user applications in which a point modification of a scene can be made remotely. For example, it is possible to consider adding a new "message" in graphic form on one or more remote terminals. It is also possible to replace certain objects, or to indeed replace the entire scene;
- multi-media consultation services using 2D or 3D graphic objects.

Description formats of graphic scenes are already known. Hence the ISO/IEC DIS 14772-1 Standard describes the VRML 2.0 format. The MPEG-4 standardization group has also defined a scene description format called BIFS (Binary Format for Scene) which was inspired by VRML 2.0. The BIFS format is notably introduced in "The MPEG4 Systems Verification Model" (ISO/IEC JTC1/SC29/WG 11-N1693, MPEG 97, April 1997).

This scene description format has the aim of describing the space-time relationships between the various graphic objects of a scene. To do this, it defines a certain number of nodes, or objects, representing all the graphic primitives that one wishes to represent. Each of these nodes include pre-defined fields which represent the characteristics of these nodes.

In other words, the BIFS format allows the transmission of a scene structure in the form of a parametric description or a script.

The disadvantage of this technique is that, if it is providing the animation of a graphic scene, it does not permit remote modification of it. For example, it is not possible to add a new object, to delete from it or to add another object etc. These functions are nevertheless necessary, particularly in the applications considered above.

The format called "External Authoring Interface" (which can be referred to on the server http:/www.sgi.com) is already known and proposes modifying the parameters of the scene using an interface standardized in "Java" (registered trade mark) language.

It is also possible to pre-program the changes in the scene by connections between fields, which are mechanisms for the passage of events, called "ROUTEs" in VRML and in BIFS format described by the MPEG4 group. The "ROUTEs" allow one to define the connections in such a way that, when a first field changes in value, the second field to which it is connected by a "ROUTE" also takes the same value.

However these two methods have major disadvantages:
- the "external API" is used to modify the VRML scene using an application in "Java" language. This "Java" application can be downloaded from a server. However this method has the following two disadvantages:
  - downloading a "Java" class is expensive in terms of transmission resources:
  - this mode assumes that any terminal implementing this mechanism contains a virtual "Java" machine.
- The demands on the terminal are therefore high
- in addition, both methods assume that the modification parameters of a scene are known a priori. Obviously this is not the case during use of animation in a communication application.

The MPEG4 system has developed a first version of a scene up-date format, but it is neither complete nor optimized.

Yet other techniques are known, such as D-VRML described by ARIKAWA. However, they remain restricted to modifying a pre-existing original scene and only allow a limited number of applications (as will be seen more clearly in what follows, the recognition of this problem is, in itself, a part of the invention).

A purpose of the invention is notably to remedy these disadvantages of the state of the technology.

More precisely, a purpose of the invention is to provide a data signal, as well as a method and a device for using it, which allow simple remote modification to be carried out and which consume little in terms of transmission resources for any type of graphic scene.

In other words, a notable objective of the invention is to provide a technique for the remote modification of graphic scenes which responds to at least one of the following criteria:
- simplicity in editing and interpreting the data;
- low memory consumption and low consumption of transmission resources;
- capability of modifying any type of object and any type of graphic scene;
- possibility of modifying objects, or nodes in any fashion whatsoever, that is to say non-predefined.

Another purpose of the invention is to provide a technique that allows the creation of simple and inexpensive multi-media terminals, that is to say terminals that do not necessitate either large calculation means or large data memory means.

A further objective of the invention is to provide a technique, capable of functioning on low bit rate transmission networks.

Another objective of the invention is to provide a technique which is compatible with the VRML and MPEG-4 standards.

These objectives and others that will become more clearly apparent in what follows have been achieved with the help of a data signal for modification of a graphic scene, intended for means of constructing images that can be shown on at least one screen, said signal comprising frames for up-dating the graphic scene, certain of said frames comprising a command for the replacement of the existing graphic scene by a new graphic scene.

Hence, the up-date commands comprise, according to the invention, a new command that allows complete replacement of one scene by another to be carried out. This aspect rests on a completely novel approach to the animation. In effect, the man skilled in the art has always considered that there was only one single scene (the original scene) that had to be changed as one goes along, by acting on elements of the scene.

According to the invention a higher level is arrived at in which one does not consider that there is only one scene. It is there proposed that in a single operation one is able to change the whole of the scene. This enables one to provide notably new applications which have not been considered and which are impossible with the previous techniques, such as broadcasting by digital television, techniques known as "multicast" (for example on the Internet) and services referred to as "push" services.

For example, the invention allows the momentary replacement of a "video" scene, such as a film, by an "interactive advertising" scene, without waiting for a request from the user.

Advantageously, certain of said frames also carry at least one of the commands belonging to the group comprising the following commands:

insertion of an element of said graphic scene modification of an element of said graphic scene deletion of an element of said graphic scene said means of construction up-date said scene in relation to said up-date frames.

The operations for modifying a graphic scene are hence very simple, and demand little in transmission resources. This signal can therefore be transmitted on low bit rate networks and do not require large means in the terminals that receive them.

By an "element" one understands notably the objects or nodes, the fields of a node, the values of a field, the connections between two fields and the complete scene.

Hence, said commands for insertion of an element can include commands for the insertion of at least one of the elements belonging to the group comprising:

insertion of a new object insertion of a new value into an existing vector (or multiple) field;

insertion of a new connection between two fields of two existing objects ("ROUTE").

Similarly, said commands for deletion of an element can include commands for deletion of at least one of the elements belonging to the group comprising:

deletion of an existing object deletion of a value in an existing vector field;

deletion of an existing connection between two fields of two existing objects ("ROUTES").

Said commands themselves for replacement of an element can include commands for replacement of at least one of the elements belonging to the group comprising:

replacement of an existing object by a new object;

replacement of a characterization field of an object by a new characterization field;

replacement of a value of a characterization vector field;

replacement of an existing connection between two fields of two existing objects ("ROUTE");

replacement of a graphic scene.

According to one advantageous embodiment of the invention, said commands comprise:

a first field designating the type of command, among at least certain of the following types : insertion, deletion, replacement and graphic scene replacement;

a second field designating the type of element concerned, among the following elements, according to the type of command : object, field, value of vector field and connection;

a third field defining the elements concerned.

The invention also concerns a method of transmission of such a signal. This method comprises notably a step of updating said graphic scene, in which one provides the transmission of frames for up-dating said graphic scene, carrying at least one of the commands belonging to the group comprising the following commands:

insertion of an element of said graphic scene;

modification of an element of said graphic scene;

deletion of an element of said graphic scene replacement of the graphic scene.

Similarly, the invention relates to a device for the restitution of a graphic scene, intended to be shown on at least one screen, comprising means for up-dating said scenes, from frames for up-dating said graphic scene, carrying at least one of the commands belonging to the group including the following commands:

insertion of an element of said graphic scene;

modification of an element of said graphic scene;

deletion of an element of said graphic scene replacement of the graphic scene.

Other characteristics and advantages of the invention will more clearly become apparent on reading the following description of a preferred embodiment of the invention, given by way of a simple illustrative and non-limitative example, and appended drawings, in which.

Figure 5:
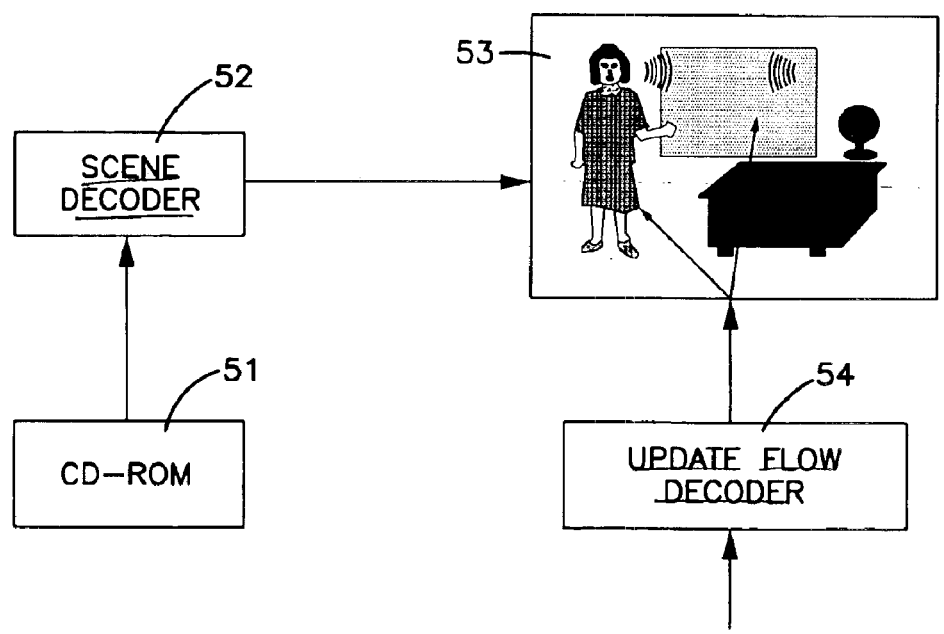
Figure 6:
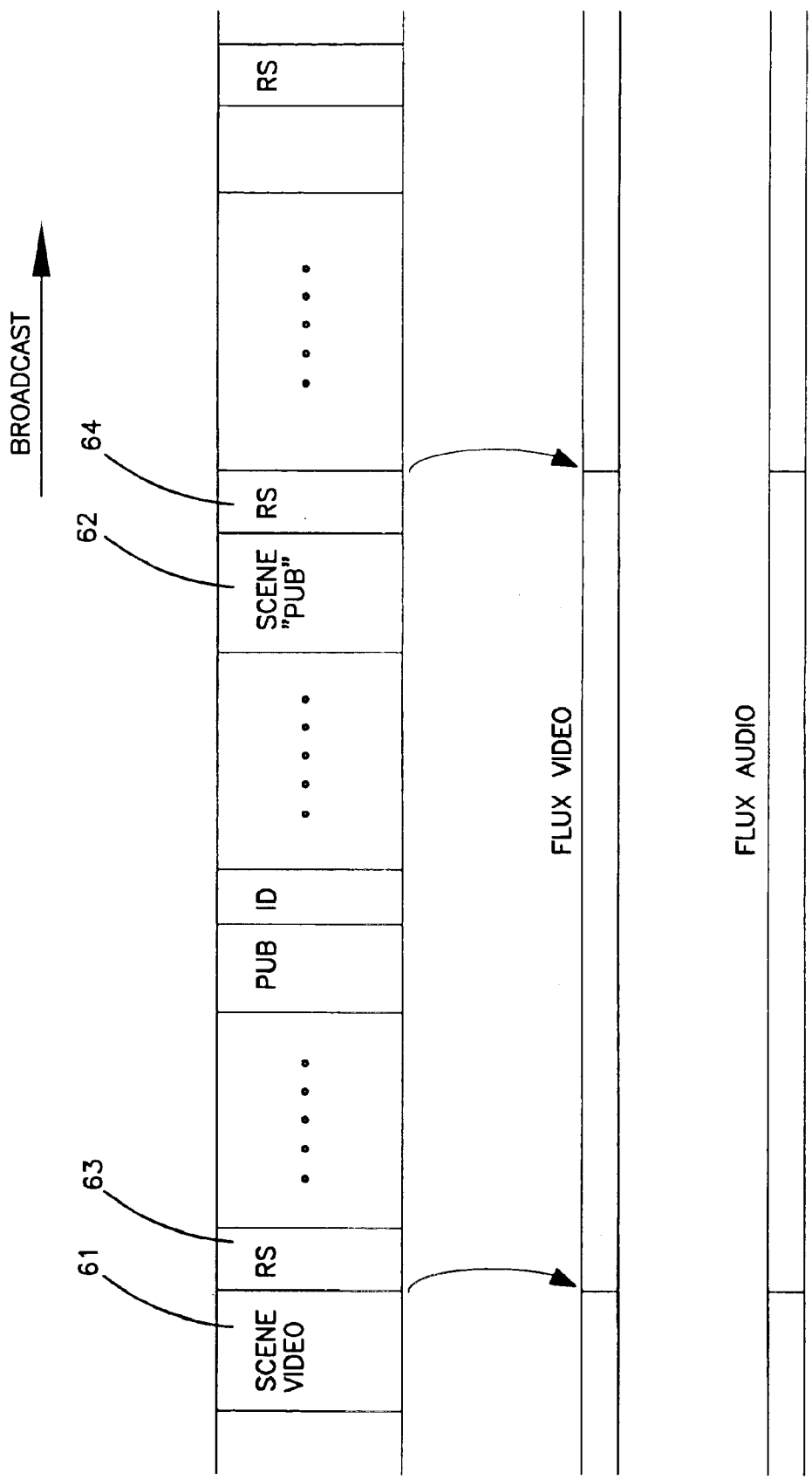

FIG. 5 describes a second example of use of the technique of the invention;

FIG. 6 illustrates an example of use of the scene replacement command of the invention.

Figure 1:
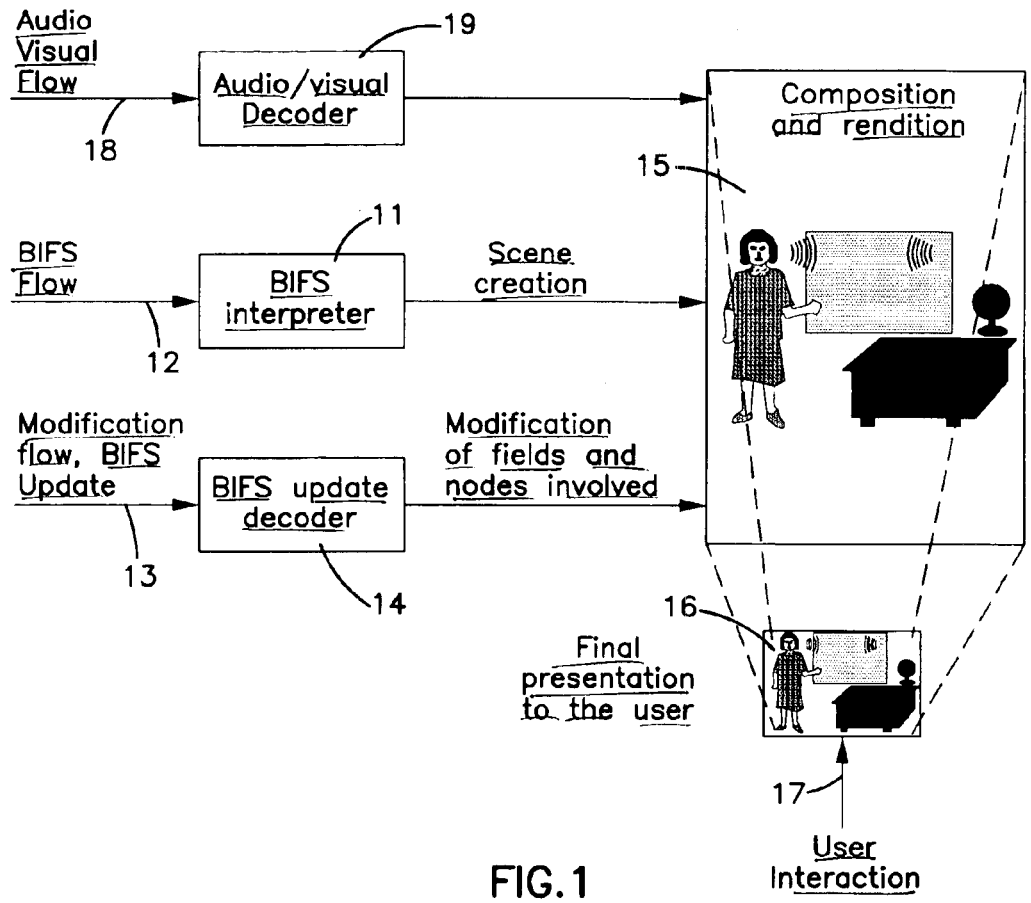
FIG. 1 illustrates the general principle of implementing the invention.

Therefore, FIG. 1 shows an outline of a terminal, for example, compatible with the MPEG-4 standard and taking into account the signal, or flow, for scene modification of the invention.

This terminal comprises means 11 of creating the original scene, from a data stream 12, in BIFS format. In other words, the terminal loads the graphic scene. This is described in terms of objects or nodes.

It will be recalled that the aim of the BIFS scene description format is to describe the space-time relationships between the graphic objects of a scene. To do this, the BIFS format defines a certain number of "nodes" representing all the graphic primitives that one wishes to be able to represent.

The nodes are entities which represent a graphic primitive. For example, the Sphere, Cone, Transform etc. nodes can be defined. Each of the nodes have a characterizing field and which is sent in the scene description just after the declaration of the node.

Some of the nodes are referred to as being able to be referenced, a single identifier is brought together with said node. Certain of the fields are declared as being capable of being modified from outside, others as being of fixed values. The modifiable values will be able to be reached by the up-date mechanism of the invention.

Finally the descriptions in BIFS and VRML format also include particular entities called "ROUTEs". The "ROUTEs" are the declarations which permit one, in the scene description language, to specify the passage of events between two fields of two nodes of the scene.

According to the invention, certain of these nodes can be declared as modifiable nodes, which will allow then to be modified in the future. This can be expressed by the "DEF" mechanism in VRML, and a similar mechanism in the MPEG-4 system.

Once this scene is loaded, either through a request from the user (interactive mode) or in an automatic way at a certain instant (passive mode, also called a "push model"), an up-date frame 13, called "BIFS-update", can be loaded in order to modify one or more elements of the scene if necessary.

The modification is provided by the decoder 14, which receives the frame 13 and which carries out the corresponding commands.

Hence an animated image 15, is obtained that can be shown (16) to the user. If the need arises, this can intervene (17) with the help of a suitable interface. This intervention brings about a new modification if the need arises.

Each modification command can have 4 basic forms:
  insertion of a field
  modification of a field
  deletion of a field
  replacement of the entire scene Each elementary command can be applied either to a single node, a vector or a simple field or to a "ROUTE". A fourth command is provided for the complete replacement of a scene. This command, essential according to the invention, is described in greater detail below.

Therefore, the following modification commands are provided:

Insertion commands:
  to insert a new node into an existing family of nodes ("grouping node"). The identifier is supplied of the node of the "grouping node" type into which a new node "NodeId" must be inserted. Then there are three choices for inserting a new node : it is inserted either at the end of the "children" field of the "grouping node", at the beginning, or at a certain position marked by its index Index. Finally, the value of the new node to be inserted is sent.
  to insert a new value into a multiple field. The identifier "Id" of the node to be modified, the index of the field concerned by the modification, marked by "fieldNb" are supplied. Then there are three choices for inserting a new value : this is inserted either at the end of the multiple field, at the beginning, or at a certain position marked by its index Index. Finally, the value to be inserted is sent. This value can be a new node or a new value for any type.
  to insert a new "ROUTE". This "ROUTE" is specified by the specification of the starting node marked by "id1" and the field concerned "field1" and of the node marked by its identifier "id2" and the field to be modified "field2" in this node.

Deletion commands
  a node can be deleted by giving its identifier "id".
  it is also possible to delete a particular value of a multiple field, also called an indexed value ("idxValue". To do this, as previously, the identifier of the node to be modified, id, and the field concerned by the modification marked by "fieldNb" are supplied. Finally, a certain position is sent that is marked either by its index Index or by the fact that it is the first of the multiple field, or by the fact that it is the last of the multiple field.
  finally a "ROUTE" can be deleted by indicating its identifier "RouteId"

Value replacement commands
  it is possible to replace a node by supplying its identifier "Id" followed by the new value of the node.
  a specific field of a given node can be replaced. To do this, the identifier of the node to be modified "Id" and the field concerned by the modification marked by "FieldNb" must be supplied. This field can itself be a new node, a multiple value field or a simple value field.
  it is also possible to modify a specific value of a multiple field. To do this, one sends the identifier of the node to be modified "Id", and the field concerned by the modification marked by "FieldNb", and finally the position in the multiple field marked, either by its index "Index", or by the fact that it is the first of the multiple field, or by the fact that it is the last of the multiple field. Then, the new value of the field is sent.
  It is finally possible to modify a "ROUTE", by sending its identifier, followed by the new "ROUTE" as specified in the preceding paragraphs.

Scene replacement command: finally it is possible to replace the entire scene by simply giving the new value of the total scene.

Figure 2:
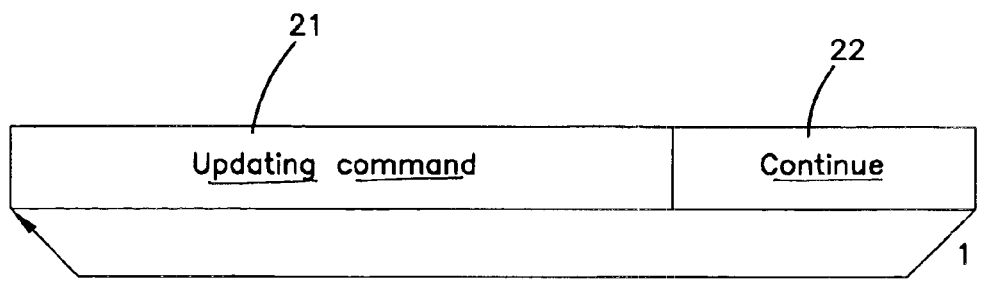
FIG. 2 shows, in a diagrammatic manner the structure of an up-date frame according to the invention.

The frame "BIFS-update" 13 can therefore be constructed according to the diagram in FIG. 2. It comprises an up-date command 21, followed by a "continuous" indicator 22, having the value (for example) "0" if there is no further command to follow in the frame, and having the value "1" if not (in the example).

Figure 3:
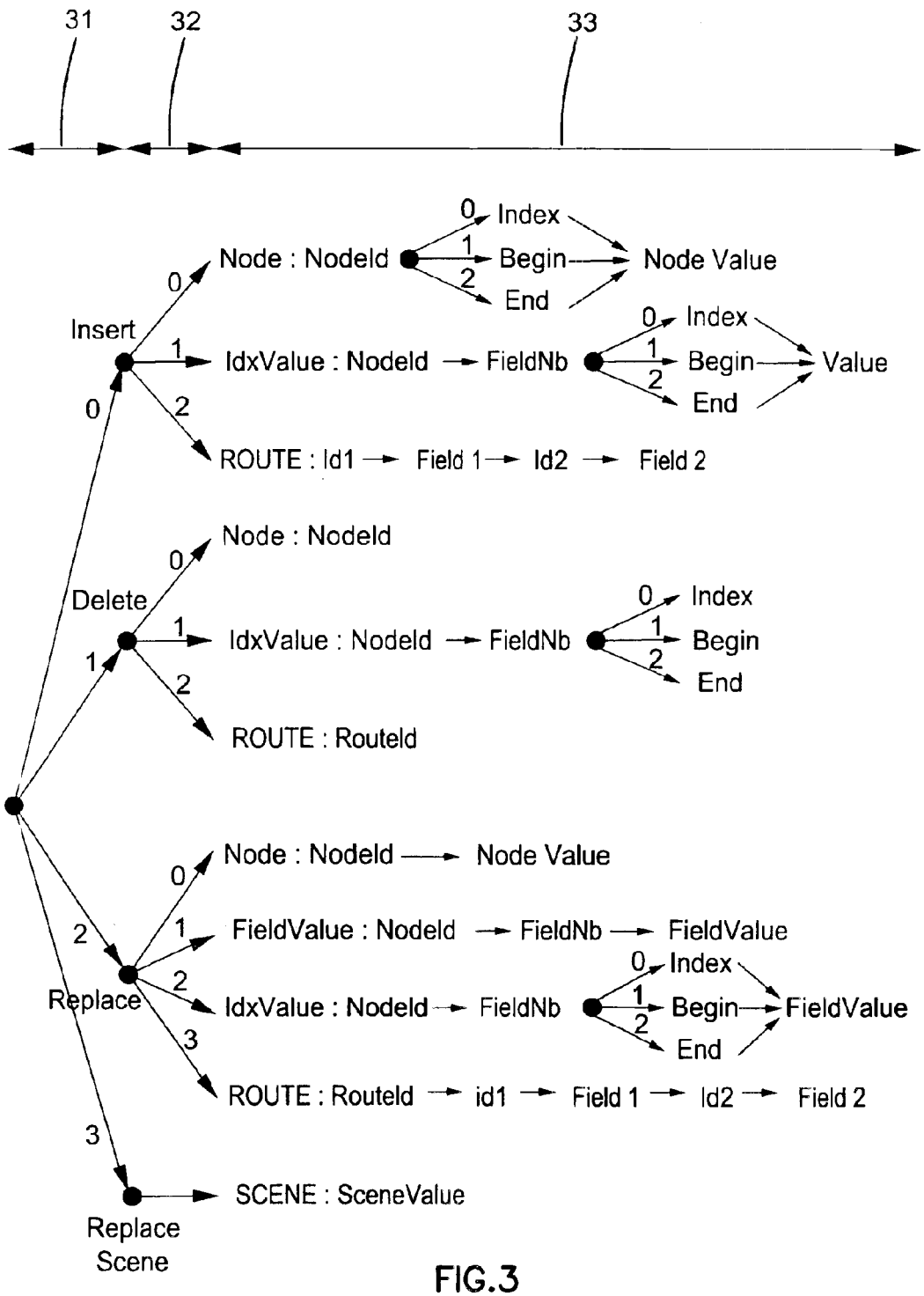
FIG. 3 shows the detail of the semantics of the elementary commands of the frame in FIG. 2.

The syntax of the elementary commands can, for example, be that illustrated in FIG. 3.

At a first level 31, a specific code is associated to the four types of command, for example:
  0: insertion (insert);
  1: deletion (delete);
  2: replacement (replace);
  3: scene replacement (replace scene).

At a second level 32, a specific code is given to each type of element concerned.

Hence for the insertion or the clearing, there are:
  0: insertion of an object (node);
  1: insertion of a value into a vector field (IdxValue)
  2: insertion of a "ROUTE".

For the replacements there are:
  0: replacement of an object (node);
  1: replacement of a field (FieldValue);
  2: replacement of a parameter of a vector field (IdxValue);
  3: replacement of a "ROUTE".

Finally, at a third level 33, the precise parameters of each element concerned are made clear. Hence one indicates, in the way already described above:
  insertion of an object : new identifier for the object, and a list of fields, in accordance with the structure described above;
  insertion of parameters : identifiers of the node (nodeld) and of the field (fieldNb), and the position for the insertion, in the form:

code: - 0: start (first value);
    1: index of the value
    2: end (final value),
corresponding value (value).

insertion of a "ROUTE": identifier of the source node (id1), of the field of the source node (field 1), identifier of the destination node (id2), field of the destination node (field 2);

clearing of a parameter : identifiers of the node, the field, index and possibly location of the deletion;

replacement of an object: identifier of the object, new value of the object;

replacement of a field : identifiers of the node and of the field, new value of the field;

replacement of a parameter : identifiers of the node and of the field, index of the parameter, new value;

replacement of a "ROUTE": identifier of the "ROUTE", identifiers of the source node and of the source field, identifier of the destination node and of the destination field;

replacement of a scene : value of a new scene.

It should be noted that the proposed structure allows one to encode the first level 31 on only 2 bits and the second level 32 on only 2 bits.

Figure 4:
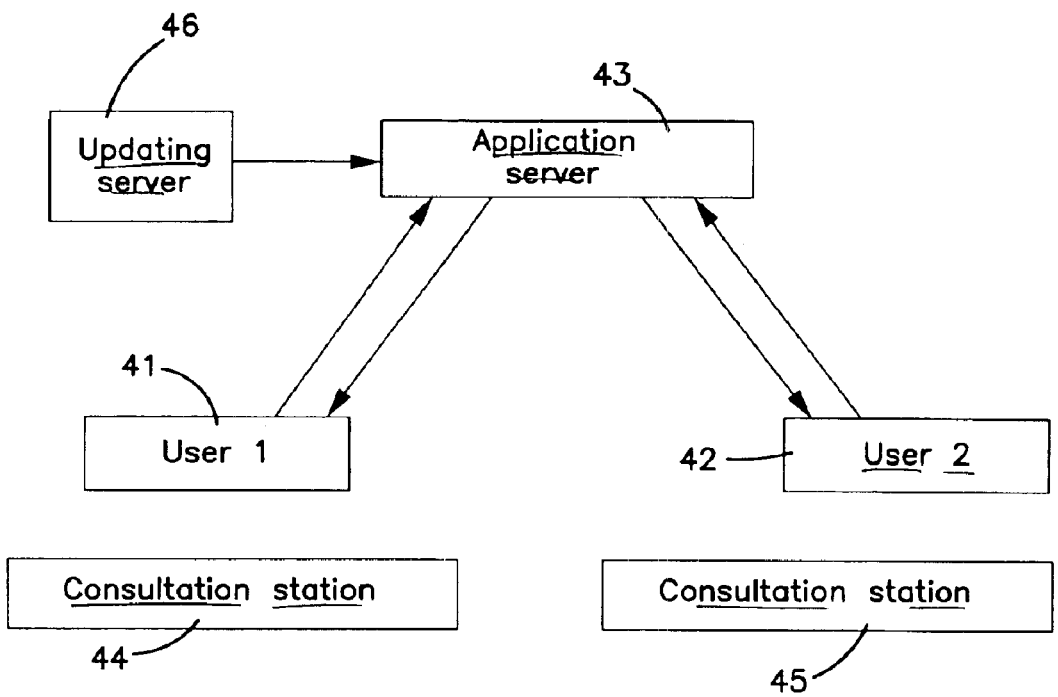
FIG. 4 shows a first example of use of the technique of the invention.

FIG. 4 illustrates a first example of use of the proposed modification technique according to the invention, in the context of a tele-sales application. On initialization, the users 41 and 42 are connected with one another on the application server 43, via their multimedia terminals 44 and 45. The server 43 shows them a virtual shop for example.

The update server 46, informed of this connection, can then send graphic advertising messages, in the form of "added objects" in order to give information about the latest promotions. The added objects then appear in the scene shown on the terminals. Similarly, it is possible to delete an object (corresponding for example to an object withdrawn from sale) or to modify an element of the scene whatsoever.

FIG. 5 illustrates another application of the invention, namely interactive teaching. The user of this remote teaching application loads an initial scene from his CD-Rom 51, restituted by the scene decoder 52.

Next, a teacher or other students connected to the network cause new data in Table 53 to appear in order to illustrate the course, by using the "BIFS-Update" representation according to the invention. These new data are decoded by the "update" flow decoder 54.

An example of scene modification data flow will now be described in detailed fashion. In this example, one displays a cube at the initial moment animated when the user clicks onto the object. Next one inserts a sphere. Then the interpolation of the positions is changed so that it relates to the sphere. Finally the cube is deleted from the scene.

This example is given in VRML format but may easily be transcribed into BIFS in its binary version. The original scene is given by:

```
DEFT Transform{
    translation 0 0-5
    children[
        DEFTOUCH TouchSensor{ }
        Shape{
            appearance Appearance{
                material DEFM Material{
                    diffuseColor 0.5 0 0
```

-continued

```
                }
            geometry DEFCUBE Cube{
                size 1 1 1
                }
            }
        }
    ]
}
DEFTIME TimeSensor
DEFINTER CoordinateInterpolator
{
    key      [0.0,1.0]
    keyValue [-505,50-5]
}
ROUTETOUCH.touchTime TO TIME.startTime
ROUTETIME.fraction TO INTER.keyValue
ROUTEINTER.value changed TO T.translation
```

A remote usercan then modify the scene in the following manner:

.Add an object (sphere):

```
0                       Insertion command
0                       An object in a "grouping" node is inserted
T                       The object T is added
2                       This object is added at the end
DEF T2 Transform{       New node transform containing a sphere is
translation 10 10 0     added
children[
    Shape{
        geometry Sphere{ }
    }
]
}
```

.Modification of a "ROUTE"

```
2       Value replacement command
4       Replacement of a ROUTE
2       The route 2 is replaced (the third in the file)
INTER   One routes to the node "inter"
3       Field number 3 (value changed)
T2      Transformation T2
7       The translation of the Transform node
```

Hence the animation will now be directed to the new inserted sphere.

.Deletion of an object (the cube):

1 Deletion command
2 Deletion of the node
CUBE The cube is deleted from the scene As has already been indicated, the essential novelty of the invention resides in the use of a command for the replacement of the current scene by another, and in the discovery of the necessity of such a command whereas the previous methods only considered actions taken on a single scene.

In simplified applications, it should be noted in addition that this scene replacement command can be the only one used.

By using the technique of the invention ("BIFS-Update"), it is possible at any instant to connect into the scene modification flow (as into a television channel). The scene replacement commands then become access points which are random to the flow (this notion can be compared to that of the "intra" frame in video).

This replacement command allows one to use the signal of the invention in the context of very broad applications, in relation to known techniques, such as broadcasting applications for digital television, the "multicast" techniques on the "internet" and notably the services called "push" services. The invention is also compatible with "pull" type services and others.

FIG. 6 illustrates an example, relating to broadcast advertising. One wishes to replace the video scene 61 (a film) momentarily by a new interactive advertising scene 62, described in the form of a BIFS scene.

The scene replacement command RS 63 allows one to impose the new scene on a user (without any action on the latter's part). A new scene replacement command RS 64 allows one to return to the video scene (or to a new scene).

What is claimed is:

1. Data signal embodied in a carrier wave for modifying a graphic scene to be displayed on a screen of at least one terminal, said graphic sene being made of a set of at least one graphic object, each of said graphic objects being defined by at least one field, said objects being used in said at least one terminal for constructing an image corresponding to said graphic scene, to be displayed on said screen, said signal including frames for up-dating the graphic scene, wherein certain of said frames include a command for replacement of an existing graphic scene by a new graphic scene.

2. Signal according to claim 1, wherein said frames (13) also carry at least one of the commands (21) belonging to a group comprising the following commands:

insertion of an element of said graphic scene modification of an element of said graphic scene deletion of an element of said graphic scene said means of construction up-dating said scene in relation to said up-date frames.

3. Signal according to claim 2, wherein said commands for insertion of an element include commands for the insertion of at least one of the elements belonging to the group comprising:

insertion of a new object insertion of a new value into an existing vector field;

insertion of a new connection between two fields of two existing object ("ROUTE").

4. Signal according to claim 2, wherein said commands for the deletion of an element comprise deletion commands for at least one of the elements belonging to the group comprising:

deletion of an existing object deletion of a value in an existing vector field;

deletion of an existing connection between two fields of two existing objects ("ROUTES").

5. Signal according to claim 2, wherein said commands for the replacement of an element include commands for the replacement of at least one of the elements belonging to the group comprising:

replacement of an existing object by a new object;

replacement of a characterization field of an object by a new characterization field;

replacement of a value of a characterization vector field;

replacement of an existing connection between two fields of two existing objects ("ROUTE");

replacement of a graphic scene.

6. Signal according to claim 1, wherein said commands comprise:

a first field designating the type of command, among at least certain of the following types: insertion, deletion, replacement and graphic scene replacement;

a second field designating the type of element concerned, among the following elements, according to the type of command: object, field, value of vector field and connection;

a third field defining the elements concerned.

7. Method of transmission of a data signal for modifying a graphic scene to be displayed on a screen of at least one terminal, said graphic scene being made of a set of at least one graphic object, each of said graphic objects being defined by at lest one field, said objects being used in said at least one terminal for constructing an image, corresponding to said graphic scene, to be displayed on said screen, said signal including frames for up-dating the graphic scene, wherein certain of said frames include a command for replacement of an existing graphic scene by a new graphic scene.

8. A terminal for the processing of a data signal for modifying a graphic scene to be displayed on a screen of said terminal, said graphic scene being made of a set of at least one graphic object, each of said graphic objects being defined by at least one field, said objects being used in said at least one terminal for constructing an image, corresponding to said graphic scene, to be displayed on said screen, said signal including files for up-dating the graphic scene, wherein certain of said frames include a command for replacement of an existing graphic scene by a new graphic scene, and wherein said terminal includes means for receiving and processing said command for replacement, so as to delete said existing graphic scene and to display the entirety of said new graphic scene as a result of a sole command.

9. A data signal embodied in a carrier wave for modifying a graphic scene of the type to be displayed on a screen of at least one terminal, comprising:

a plurality of frames for up-dating a graphic scene, the graphic scene being made of a set of at least one graphic object, each of said graphic objects being defined by at least one field, said objects being used in the at least one terminal for constructing an image, corresponding to said graphic scene and to be displayed on said screen; and, a command included within certain of said plurality of frames, the command initiating replacement of said graphic scene by a new graphic scene, deleting said graphic scene and to provide for the entirety of said new graphic scene with a sole command.

10. A data signal embodied in a carrier wave for modifying a graphic scene of the type to be displayed on a screen of at least one terminal, comprising:

the graphic scene being made of a set of at least one graphic object, each of said graphic objects being defined by at least one field, said objects being used in said at least one terminal for constructing an image, corresponding to said graphic scene, to be displayed on said screen;

a plurality of frames for up-dating the graphic scene; and, certain of said frames including a command for replacement of said graphic scene by a new graphic scene, said command for replacement being able to be sent to said at least one terminal without any request from said terminal.

11. A data signal embodied in a carrier wave for modifying a graphic scene of the type to be displayed on a screen of at least one terminal, the signal comprising:

the graphic scene being made of a set of at least one graphic object, each of said graphic objects being defined by at least one field, said objects being used in said at least one terminal for constructing an image, corresponding to said graphic scene, to be displayed on said screen, said signal;

a plurality of frames for up-dating the graphic scene; and, said frames including a command chosen exclusively among the four types of commands belonging to the group comprising the following commands:
insertion of an element of said graphic scene;
modification of an element of said graphic scene;
deletion of an element of said graphic scene;
replacement of an existing graphic scene by a new graphic scene.

12. The data signal according to claim 11, wherein said four types of commands are coded with 2 digits.

13. A data signal embodied in a carrier wave for modifying a graphic scene, the graphic scene made of an assembly of at least one graphic object, comprising:

each graphic object defined by at least one field;

said graphic objects being used in at least one terminal for constructing an corresponding to said graphic scene to be displayed on said screen; and frames for up-dating the graphic scene;

wherein certain of said frames include a command for replacement of the graphic scene by a new graphic scene.

14. A method for modifying a graphic scene displayed on a screen of at least one terminal, the method comprising the steps of:

providing said graphic scene including at least one graphic object, each of said graphic objects being defined by at least one field;

constructing an image from said graphic objects and displaying said image on at least one terminal;

transmitting a data signal to each trial displaying the image, the data signal including frames for up-dating the graphic scene, wherein certain of the frames include a command for replacement of said graphic scene by a new graphic scene.

15. A terminal for the processing of a data signal for modifying a graphic scene to be displayed on a screen of said terminal, comprising:

said graphic scene being made of a set of at least one graphic object;

each of said graphic objects being defined by at least one field;

said objects being used in said at least one terminal for constructing an image, corresponding to said graphic scene, to be displayed on said screen;

said signal including frames for up-dating the graphic scene;

certain of said frames including a command for replacement of an existing graphic scene by a new graphic scene, and said terminal including means for receiving and processing said command for replacement, so as to delete said existing graphic scene and to display the entirety of said new graphic scene as a result of a sole command.

16. Data signal recorded on a computer readable medium for modifying a graphic scene to be displayed on a screen of at least one terminal, said graphic scene being made of a set of at least one graphic object, each of said graphic objects being defined by at least one field, said objects being used in said at least one terminal for constructing an image corresponding to said graphic scene, to be displayed on said screen, said signal including frames for up-dating the graphic scene, wherein certain of said frames include a command for replacement of an exiting graphic scene by a new graphic scene.

17. Data signal for modifying a graphic scene embodied in a carrier wave to be displayed on a screen of at least one terminal, said graphic scene being made of a set of at least one graphic object, each of said graphic objects being defined by at least one field, said objects being used in said at least one terminal for constructing an image corresponding to said graphic scene, to be displayed on said screen, said signal including frames for up-dating the graphic scene, wherein certain of said frames include a command for replacement of an existing graphic scene by a new graphic scene.

18. A method for receiving and processing of a data signal embodied in a carrier wave for modifying a graphic scene to be displayed on a screen of a terminal, said graphic scene being made of a set of at least one graphic object, each of said graphic objects being defined by at least one field, said objects being used in said at least one terminal for constructing an image, corresponding to said graphic scene, to be displayed on said screen, said signal including frames for up-dating the graphic scene, wherein certain of said frames include a command for replacement of an existing graphic scene by a new graphic scene, and wherein said method includes a step of receiving said signal and a step of processing said command for replacement, so as to delete said existing graphic scene and to display the entirety of said new graphic scene as a result of a sole command.

19. A data signal recorded on a computer readable medium for modifying a graphic scene of the type to be displayed on a screen of at least one terminal, comprising:

a plurality of frames for up-dating a graphic scene, the graphic scene being made of a set of at least one graphic object, each of said graphic objects being defined by at least one field, said objects being used in the at least one terminal for constructing an image, corresponding to said graphic scene and to be displayed on said screen; and, a command included within certain of said plurality of frames, the command initiating replacement of said graphic scene by a new graphic scene, deleting said graphic scene and to provide for the entirety of said new graphic scene with a sole command.

20. A data signal recorded on a computer readable medium for modifying a graphic scene of the type to be displayed on a screen of at least one terminal, comprising:

the graphic scene being made of a set of at least one graphic object, each of said graphic objects being defined by at least one field, said objects being used in said at least one terminal for constructing an image, corresponding to said graphic scene, to be displayed on screen;

a plurality of frames for up-dating the graphic scene; and, certain of said frames including a command for replacement of said graphic scene by a new graphic scene, said command for replacement being able to be sent to said at least one terminal without any request from said terminal.

21. A data signal recorded on a computer readable medium for modifying a graphic scene of the type to be displayed on a screen of at least one terminal, the signal comprising:

the graphic scene being made of a set of at least one graphic object, each of said graphic objects being defined by at least one field, said objects being used in said at least one terminal for constructing an image, corresponding to said graphic scene, to be displayed on said screen, said signal;

a plurality of frames for up-dating the graphic scene; and, said frames including a command chosen exclusively among the four types of commands belonging to the group comprising the following commands:
insertion of an element of said graphic scene;
modification of an element of said graphic scene;
deletion of an element of said graphic scene;
replacement of an existing graphic scene by a new graphic scene.

22. A data signal recorded on a computer readable medium for modifying a graphic scene, the graphic scene made of an assembly of at least one graphic object, comprising:

each graphic object defined by at least one field;

said graphic objects being used in at least one terminal for constructing an corresponding to said graphic scene to be displayed on said screen; and frames for up-dating the graphic scene;

wherein certain of said frames include a command for replacement of the graphic scene by a new graphic scene.

* * * * *